United States Patent
Jagota et al.

(10) Patent No.: US 10,817,479 B2
(45) Date of Patent: Oct. 27, 2020

(54) RECOMMENDING DATA PROVIDERS' DATASETS BASED ON DATABASE VALUE DENSITIES

(71) Applicant: salesforce.com, inc., San Francisco, CA (US)

(72) Inventors: Arun Kumar Jagota, Sunnyvale, CA (US); Marc Joseph Delurgio, San Anselmo, CA (US); Venkata Murali Tejomurtula, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 359 days.

(21) Appl. No.: 15/631,306

(22) Filed: Jun. 23, 2017

(65) Prior Publication Data

US 2018/0373732 A1    Dec. 27, 2018

(51) Int. Cl.
*G06F 16/185*    (2019.01)
*G06F 16/21*    (2019.01)
(Continued)

(52) U.S. Cl.
CPC .......... *G06F 16/185* (2019.01); *G06F 16/214* (2019.01); *G06F 16/2462* (2019.01); *G06F 16/313* (2019.01); *G06F 17/18* (2013.01)

(58) Field of Classification Search
CPC .... G06F 16/185; G06F 16/313; G06F 16/214; G06F 16/2462; G06Q 30/02
(Continued)

(56) References Cited

U.S. PATENT DOCUMENTS 5,577,188 A    11/1996    Zhu
5,608,872 A    3/1997    Schwartz
(Continued)

OTHER PUBLICATIONS

X. Li, et al. "An empiric weight computation for record linkage using linearly combined fields' similarity scores," 2014 36th Annual International Conference of the IEEE Engineering in Medicine and Biology Society, Chicago, IL, 2014, doi: 10.1109/EMBC.2014. 6943848 (Year: 2014).*
(Continued)

*Primary Examiner* — Robert W Beausoliel, Jr.
*Assistant Examiner* — Arthur Ganger
(74) *Attorney, Agent, or Firm* — Dergosits & Noah LLP; Todd A. Noah

(57) ABSTRACT

Recommending data providers' datasets based on database value densities is described. A database system determines a provider dataset density for a value by identifying a frequency of the value in a dataset that is provided by a data provider. The database system determines a user database density for the value by identifying a frequency of the value in a database used by a data user. The database system determines a relative density based on a relationship between the provider dataset density and the user database density. The database system determines an evaluation metric for the value, based on a combination of the relative density and the user database density. The database system causes a recommendation to be outputted, based on a relationship of the evaluation metric relative to other evaluation metrics for other values, which recommends that the data user acquire at least a part of the dataset.

17 Claims, 3 Drawing Sheets

(51) Int. Cl.
*G06F 16/31* (2019.01)
*G06F 16/2458* (2019.01)
*G06F 17/18* (2006.01)

(58) Field of Classification Search
USPC .................................................... 707/748
See application file for complete search history.

(56) References Cited

U.S. PATENT DOCUMENTS

| | | |
|---|---|---|
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,667,026 B1* | 3/2014 | Lee .................. G06Q 30/02 707/802 |
| 10,229,186 B1* | 3/2019 | Reiner ............... G06F 16/319 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian P et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0187931 A1* | 8/2005 | Cofino ............... G06F 16/22 |
| 2007/0106666 A1* | 5/2007 | Beckerle ............ G06F 16/27 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0029477 A1* | 2/2011 | Tengli ............... G06N 5/02 706/54 |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |

(56) References Cited

U.S. PATENT DOCUMENTS

2015/0172563 A1    6/2015   Jakobson et al.
2017/0091274 A1*  3/2017   Guo ........................ G06F 16/58

OTHER PUBLICATIONS

U.S. Appl. No. 13/986,251, filed Apr. 16, 2013.

* cited by examiner

RECOMMENDING DATA PROVIDERS' DATASETS BASED ON DATABASE VALUE DENSITIES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A data platform enables data providers, such as data marketplace vendors and crowd-sourced database system users, to provide their datasets to data users, such as organizations and individuals, via the data platform. A dataset may have deep data on particular verticals, such as a specialized healthcare dataset which includes the number of beds in each hospital, and useful information that is not commonly available, such as data on which products are installed in which companies. Generally, since a data user will only want certain subsets of a data provider's dataset, the data user will want to save money by purchasing only the relevant subsets of the dataset. For example, an organization that sells customer relationship management applications on the cloud will mostly want data relevant to customer relationship management software, such as a list of companies that have customer relationship management software installed on premise. A data marketplace vendor may want individual customers to only purchase small subsets of their datasets, thereby reducing the risk of leakage of the entire dataset.

Artificial Intelligence (AI) models may be used to make recommendations for a data user to purchase the data providers' datasets and/or subsets of data providers' datasets that are most likely to help the data user. Each data user's model is based on the data user's own data. Let X denote an attribute in a data provider's dataset that is suitable for modeling subsets. A single dataset may have multiple such attributes. For example, in a dataset of product installations at various companies, product category, vendor, and product (within product category) are all attributes suited to modeling subsets.

Let $P(X)$ be the empirical probability distribution of an attribute in a data provider's dataset. For example, P (product category=database management software) in a data marketplace vendor's dataset of product installations at various companies is the number of installations of any product in the category database management software found in the dataset divided by the total number of installations across all products. If the data marketplace vendor's dataset has 1,000 records that store data that indicates product installations, and 600 of these records store data that indicates the category database management software, then $P(x)=0.6$ (600 divided by 1,000). Therefore, a system that uses the popularity or density of values in the data marketplace vendor's dataset to make recommendations would make the highest recommendation for a data user to purchase a subset that includes only records that store data for database management software. However, such a recommendation fails to take into consideration the data user's potentially greater interest in records that store data that indicate the installation of certain other product categories.

For example, the data user has a customer relationship management database of a suitable entity, such as accounts in the data user's organization, that may be enriched by appending, for each such account, the various products installed at that account, as gleaned from the data marketplace vendor's dataset. For any attribute in the data marketplace vendor's dataset deemed suitable for creating subsets, the probability distribution $Q(X)$ can be computed over its various values in the organization's database. For this example, the Q(product category=database management software) in the accounts of the organization is the number of accounts in the organization having at least one product in the category database management software installed, divided by the total number of accounts in the organization. If the organization's database has 100 accounts, and 54 of these accounts store data that indicate the installation of the category database management software, then $Q(x)=0.54$ (54 divided by 100).

For any value x of this attribute X, its relevance to a data user's data can be quantified. Consider two score functions that can quantify relevance: $Q(x)$ and $Q(x)/P(x)$. $Q(x)$ may be considered as a measure of local popularity, and $Q(x)/P(x)$ may be considered as a measure of lift, or local popularity relative to global popularity. For example, Q(product category=database management software) is proportional to the number of accounts in the organization having at least one product in the category database management software installed, such that $Q(x)$ measures the local popularity of this product category within the organization. For an x for which $P(x)$ is large in a data provider's dataset, such that x is "globally" popular, $Q(x)$ will tend to be large as well. This is likely the case for the product category database management software. That is, a high proportion of accounts in the organization will have a high density for this category solely because this category is "globally" dense. For example, while the percentages differ, the most popular product category in the data marketplace vendor's dataset and the most popular product category in the organization's accounts is the product category database management software.

$Q(x)/P(x)$, or lift, may be considered as relative popularity. Specifically, if a value's local popularity in a data user's database differs from its global popularity in a data provider's dataset, the lift or relative popularity of the value will differ accordingly. For example, since $P(x)=0.6$ for the product category database management software in the data marketplace vendor's dataset, and $Q(x)=0.54$ for the product category database management software the organization's database, then $Q(x)/P(x)=0.9$ (0.54 divided by 0.6). The relative popularity or density of 0.9 indicates that the product category database management software has 90% of the popularity in the organization's database relative to its popularity in the data marketplace vendor's dataset.

In another example, if the data marketplace vendor's dataset has 100 records that store data for the category customer relationship management software, then $P(x)$ for the category customer relationship management software equals 0.1 (100 divided by 1,000), and if the organization's database has 40 accounts that store data for the category customer relationship management software, then Q(x) for the category customer relationship management software=0.4 (40 divided by 100). In this example, since P(x) =0.1 for the product category customer relationship management software in the data marketplace vendor's dataset, and Q(x)=0.4 for the product category customer relationship management software in the organization's database, then Q(x)/P(x)=4.0 (0.4 divided by 0.1). The relative popularity of 4.0 indicates that the product category customer relationship management software has 400% of the popularity in the organization's database relative to its popularity in the data marketplace vendor's dataset. In the organization's accounts, customer relationship management software is relatively more popular, even if still absolutely less popular than database management software.

Therefore, a local popularity measure ranks database management software above customer relationship management software. Consequently, a system that uses the local popularity to make recommendations to a data user would make the highest recommendation for the organization to purchase a subset that includes only records that store data that indicates the installation of database management software. However, such a recommendation fails to take into consideration the organization's relatively greater interest in records that indicate the installation of customer relationship management software.

However, the lift, or relative popularity or density, measure ranks customer relationship management software above database management software. Therefore, a system that uses the relative popularity to make recommendations for a user to purchase a dataset would make the highest recommendation for the organization to purchase a subset that includes only records that store data that indicates the installation of customer relationship management software.

BRIEF SUMMARY

However, a system that uses lift, or relative popularity or density, to make recommendations for data users to purchase datasets can make obscure recommendations as the highest recommendations because the system fails to sufficiently consider local popularity. For example, if the data marketplace vendor's dataset has 1 record that stores data for the category assembly language software, then Q(x) for the category assembly language software equals 0.001 (1 divided by 1,000), and if the organization's database has 1 account that store data for the category assembly language software, then Q(x) for the category assembly language software equals 0.01 (1 divided by 100). In this example, since P(x)=0.001 for the product category assembly language software in the data marketplace vendor's dataset, and Q(x)=0.01 for the product category assembly language software in the organization's database, then Q(x)/P(x)=10.0 (0.01 divided by 0.001). The relative popularity of 10.0 indicates that the product category assembly language software has 1,000% of the popularity in the organization's database relative to its popularity in the data marketplace vendor's dataset. In the organization's accounts, assembly language software is relatively more popular, even if still absolutely less popular than database management software. Therefore, a system that uses the relative popularity to make recommendations for a user to purchase a dataset would make the highest recommendation for the organization to purchase a subset that includes only records that store data that indicates the installation of assembly language software. However, in addition to 99 of the organization's 100 accounts storing nothing for the category assembly language software, the recommendation fails to take into consideration the organization's 40 accounts that indicate the installation of customer relationship management software.

In accordance with embodiments, there are provided systems and methods for recommending data providers' datasets based on database value densities. A database system determines a provider dataset density for a value by identifying a frequency of the value in a dataset that is provided by a data provider. The database system determines a user database density for the value by identifying a frequency of the value in a database used by a data user. The database system determines a relative density based on a relationship between the provider dataset density and the user database density. The database system determines an evaluation metric for the value, based on a combination of the relative density and the user database density. The database system causes a recommendation to be outputted, based on a relationship of the evaluation metric relative to other evaluation metrics for other values, which recommends that the data user acquire at least a part of the dataset.

For example, a database system determines a provider dataset density of 0.6 for database management software, a provider dataset density of 0.1 for customer relationship management software, and a provider dataset density of 0.001 for assembly language software from these values' corresponding frequencies in a data marketplace vendor's dataset. The database system determines a user database density of 0.54 for database management software, a user database density of 0.4 for customer relationship management software, and a user database density of 0.01 for assembly language software from these values' corresponding frequencies in a data user's database. The database system determines a relative density of 0.9 for database management software, a relative density of 4.0 for customer relationship management software, and a relative density of 10.0 for assembly language software from the ratio of their user database densities to their corresponding provider dataset densities. The database system determines an evaluation metric of 0.486 for database management software by multiplying its user database density of 0.54 by its relative density of 0.9, an evaluation metric of 1.6 for customer relationship management software by multiplying its user database density of 0.4 by its relative density of 4.0, and an evaluation metric of 0.1 for assembly language software by multiplying its user database density of 0.01 by its relative density of 10.0. The database system outputs a recommendation for the data user to acquire a customer relationship management software subset of the dataset because the evaluation metric of 1.6 for customer relationship management software is greater than the evaluation metric of 0.486 for database management software and the evaluation metric of 0.1 for assembly language software.

While one or more implementations and techniques are described with reference to an embodiment in which recommending data providers' datasets based on database value densities is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for recommending data providers' datasets based on database value densities. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, methods and systems for recommending data providers' datasets based on database value densities will be described with reference to example embodiments. The following detailed description will first describe a method for recommending data providers' datasets based on database value densities.

Figure 1:
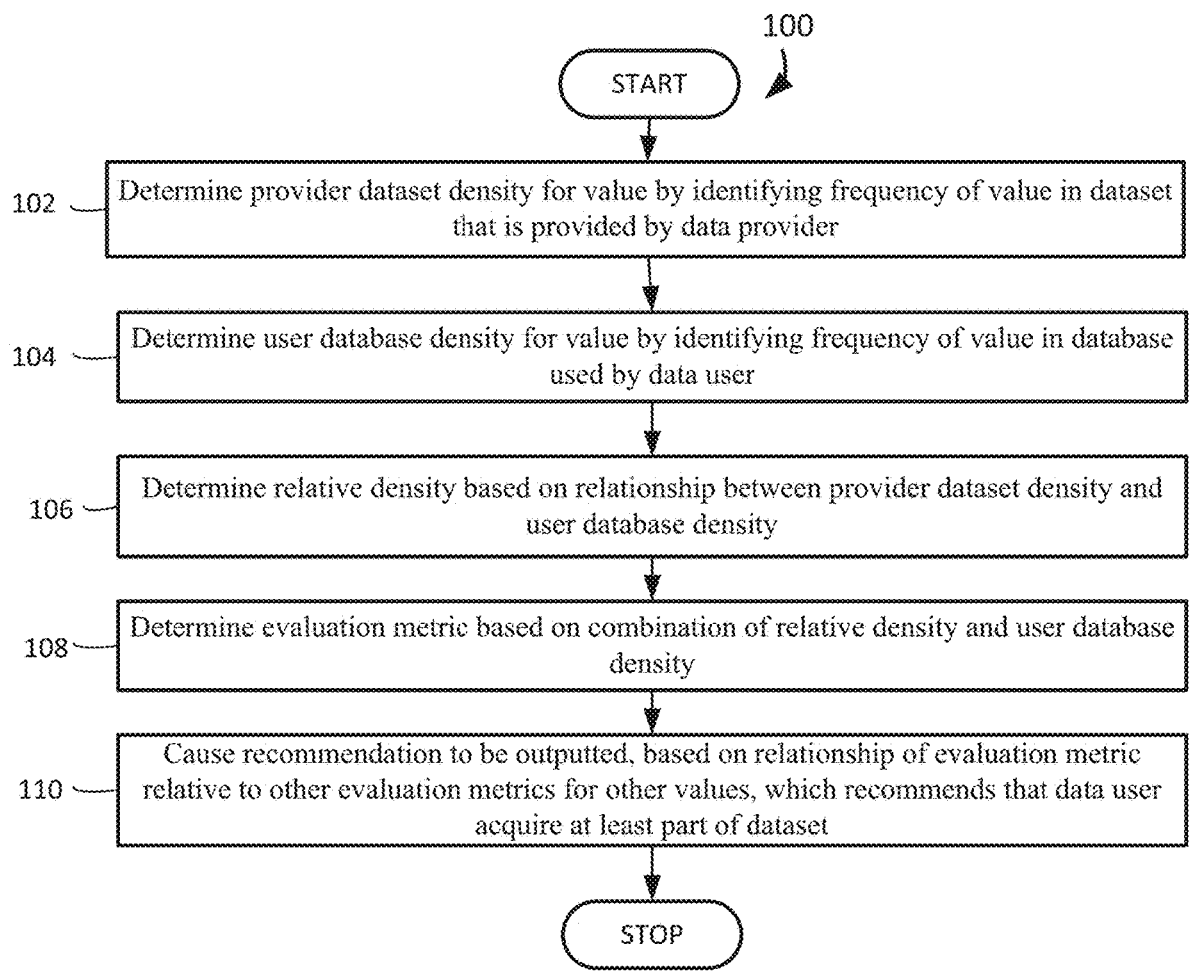
FIG. 1 is an operational flow diagram illustrating a high-level overview of a method for recommending data providers' datasets based on database value densities, in an embodiment.

FIG. 1 is an operational flow diagram illustrating a high-level overview of a method 100 for recommending data providers' datasets based on database value densities. A provider dataset density is determined for a value by identifying a frequency of the value in a dataset that is provided by a data provider, block 102. The system evaluates data value frequencies in a data provider's dataset for recommendation purposes. For example and without limitation, this can include the database system determining a provider dataset density of 0.6 for database management software, because the data marketplace vendor's dataset has 1,000 records that store data that indicates product installations, and 600 of these records store data that indicates the category database management software, such that the provider dataset density $P(x)=0.6$ (600 divided by 1,000). In another example, the database system determines a provider dataset density of 0.1 for customer relationship management software, because 100 of these records store data that indicates the category customer relationship management software, such that the provider dataset density $P(x)=0.1$ (100 divided by 1,000). In yet another example, the database system determines a provider dataset density of 0.001 for assembly language software, because 1 of these records stores data that indicates the category assembly language software, such that the provider dataset density $P(x)=0.001$ (1 divided by 1,000).

A value can be a precise meaning, text, quantity, or number that is assigned to a term. A frequency can be the rate at which something occurs or is repeated in a given sample. A dataset can be a collection of related information that is composed of separate elements but can be manipulated as a unit by a computer. A data provider can be a person or thing that supplies information or makes information available for use. A provider dataset density can be the rate at which something occurs in supplied information.

The frequency of the value in the dataset may be a frequency of the value in an attribute stored by the dataset. For example, since both the "state" attribute and the "city" attribute in the dataset may store the value "New York," the database system identifies the frequency of the value "New York" in the "state" attribute separately from identifying the frequency of the value "New York" in the "city" attribute. An attribute can be a piece of information that determines the properties of a field or tag in a group of information.

In addition to determining a provider dataset density for a value, a user database density is determined for the value by identifying a frequency of the value in a database used by a data user, block 104. The system evaluates data value frequencies in a data user's database for recommendation purposes. By way of example and without limitation, this can include the database system determining a user database density of 0.54 for database management software, because the data user's database has 100 accounts that store data that indicates product installations, and 54 of these accounts store data that indicates the category database management software, such that the user database density $Q(x)=0.54$ (54 divided by 100). In another example, the database system determines a user database density of 0.4 for customer relationship management software, because 40 of these accounts store data that indicates the category customer relationship management software, such that the user database density $Q(x)=0.4$ (40 divided by 100). In yet another example, the database system determines a user database density of 0.01 for assembly language software, because 1 of these accounts stores data that indicates the category database management software, such that the user database density $Q(x)=0.01$ (1 divided by 100).

A database can be a structured set of information held in a computer, especially one that is accessible in various ways. A data user can be an individual person or organization who operates something, especially a computer, to access information. A user database density can be the rate at which something occurs in a structured set information that may be accessed.

The frequency of the value in the database may be a frequency of the value in the attribute stored by the database. For example, since both the "state" attribute and the "city" attribute in the database may store the value "New York," the database system identifies the frequency of the value "New York" in the "state" attribute separately from identifying the frequency of the value "New York" in the "city" attribute.

For any attribute in the data provider's dataset deemed suitable for creating subsets, the probability distribution Q(X) can be computed over its various values in a suitably re-weighted version of the organization's database. For example, the Q(product category=database management software) in the accounts of the organization would be the number of accounts in the organization having at least one product in the category database management software installed divided by the total number of accounts in the organization. In this example, the concept of a suitably re-weighted version is based on the premise that not all accounts are deemed equally important. A variant of this concept assigns a weight to an account proportional to the number of opportunities closed and won on the account in the recent past, such as one year. In this variant, accounts with more closed-and-won opportunities would be deemed more important. Q(x) in the weighted version—in which closed-and-won opportunities contribute more—is equally easily obtained.

Determining the frequency of the value in the database may be based on weights that are associated with instances of the value and that correspond to entities stored by the database. For example, the database system determines that the database stores data which indicates 40 accounts for the category customer relationship management software, data for 32 of these customer relationship management software accounts indicates no closed-and-won opportunities, and data for 8 of these customer relationship management software accounts indicate closed and won opportunities. Continuing the example, the database system determines that the database stores data which indicates 100 total accounts, data for 80 of the total accounts indicates no closed-and-won opportunities, and data for 20 of the total accounts indicate closed and won opportunities. The database system assigns a weight of 1.0 to accounts with no closed-and-won opportunities and assigns a weight of 2.0 to accounts with closed-and-won opportunities. Therefore, the user database density $Q(x)=48$ (32 customer relationship management software accounts that were not won multiplied by the weight of 1.0, plus the 8 customer relationship management software accounts that were won multiplied by the weight of 2.0) divided by 120 (80 total accounts that were not won multiplied by the weight of 1.0, plus the 20 total accounts that were won multiplied by the weight of 2.0), which equals a resulting user database density of 0.40 for customer relationship management software accounts.

The weights may also take other factors, such as revenue, into consideration. For example, the database system determines a user database density for assembly language software by determining that 1 account stores data that indicates the category assembly language software, and data for this 1 account indicates low account revenue. Continuing the example, the database system determines that the database stores data which indicates 100 total accounts, data for 20 of the total accounts indicates high account revenue, data for 30 of the total accounts indicates medium account revenue, and data for 50 of the total accounts indicate low account revenue. The database system assigns a weight of 1.0 to accounts with low account revenue, assigns a weight of 2.0 to accounts with medium account revenue, and assigns a weight of 3.0 to accounts with high account revenue. Therefore, the user database density $Q(x)=1$ (1 assembly language software account multiplied by the weight of 1.0 for low account revenue) divided by 170 (50 total accounts multiplied by the weight of 1.0 for low account revenue, plus 30 total accounts multiplied by the weight of 2.0 for medium account revenue, plus 20 total accounts multiplied by the weight of 3.0 for high account revenue), which equals a resulting user database density of 0.0059 for assembly language software accounts. The weights assigned for the revenues could have been the annual revenues for each account. A weight can be the ability of something to influence decisions or actions. An instance can be a single occurrence of something. An entity can be a thing with distinct and independent existence.

After a provider dataset density and a user database density are determined, a relative density is determined based on a relationship between the provider dataset density and the user database density, block 106. The system evaluates the relationships between corresponding values in a data user's database and a data provider's dataset for recommendation purposes. In embodiments, this can include the database system determining a relative density of 0.9 for database management software, because the provider dataset density $P(x)=0.6$ for the product category database management software in the data marketplace vendor's dataset, and the user database density $Q(x)=0.54$ for the product category database management software in the organization's database, such that $Q(x)/P(x)=0.9$ (0.54 divided by 0.6). In another example, the database system determines a relative density of 4.0 for customer relationship management software, because the provider dataset density $P(x)=0.1$ for the product category customer relationship management software in the data marketplace vendor's dataset, and the user database density $Q(x)=0.4$ for the product category customer relationship management software in the organization's database, such that $Q(x)/P(x)=4.0$ (0.4 divided by 0.1). In yet another example, the database system determines a relative density of 10.0 for assembly language software, because the provider dataset density $P(x)=0.001$ for the product category assembly language software in the data marketplace vendor's dataset, and the user database density $Q(x)=0.01$ for the product category assembly language software in the organization's database, such that $Q(x)/P(x)=10.0$ (0.01 divided by 0.001). A relative density can be the rate at which something occurs or is repeated in a given sample considered in relation or in proportion to something else. A relationship can be the way in which two or more concepts or objects are connected.

The database system determines a relative density based on a relationship between the provider dataset density for a value stored by an attribute and the user database density for the same value stored by the same attribute. For example, since both the "state" attribute and the "city" attribute in the database may store the value "New York," the database system identifies the relative density of the value "New York" in the "state" attribute based on a relationship between the provider dataset density for the value "New York," stored by the "state" attribute and the user database density for the value "New York," stored by the "state" attribute, separately from identifying the relative density of the value "New York" in the "city" attribute.

Having used a relationship between a user database density and a provider dataset density to determine a relative density, an evaluation metric is determined for a value based on a combination of the relative density and the user database density, block 108. The system evaluates recommending a data provider's dataset. For example and without limitation, this can include the database system determining an evaluation metric of 0.486 for database management software by multiplying its user database density of 0.54 by its relative density of 0.9. In another example, the database system determines an evaluation metric of 1.6 for customer relationship management software by multiplying its user database density of 0.4 by its relative density of 4.0. In yet another example, the database system determines an evaluation metric of 0.1 for assembly language software by multiplying its user database density of 0.01 by its relative density of 10.0. Multiplying the user database density by its relative density is represented by the formula $Q(x)*Q(x)/P(x)$, which produces a relatively large evaluation metric when both the user database density and the relative density are relatively large, and produces a smaller evaluation metric when either the user database density or the relative density are relatively small. An evaluation metric can be a measure indicating a judgment about a relative importance of something. A combination can be a joining or merging of different parts or qualities in which the component elements are individually distinct.

The database system may determine the evaluation metric for the value based on a combination of the relative density and the user database density by summing the relative density and the user database density, which may be the sum of a weighted version of the relative density and a weighted version of the user database density. Summing the weighted version of the user database density and the weighted version of the relative density is represented by the formula $[w_1*Q(x)]+[w_2*Q(x)/P(x)]$. The weights $w_1$ and $w_2$ are learnable parameters. The database system may initialize $w_1$ and $w_2$ to qualitatively produce appropriate a priori behavior. If feedback is available, then the database system subsequently refines the weights to learn what the data user wants, which may differ from the a priori behavior. These machine learnable parameters enable customization, such that the database system can machine learn $w_1$ and $w_2$ that are unique to each data using individual or organization. Therefore, the data database system can provide a data user with recommendations that are ranked by $[w_1*Q(x)]+[w_2*Q(x)/P(x)]$, where $w_1$ and $w_2$ are the current settings of the learnable parameters. The database system can use a data user's actions, such as clicking on, acting on, liking, or disliking a certain recommendation, to adjust the learnable parameters $w_1$ and $w_2$.

For example, before any machine learning occurs for an organization, the database system initializes each of the weights $w_1$ and $w_2$ to 1.0, such that the user database density and the relative density are summed in equal proportion. Then the database system determines an evaluation metric of 10.01 for assembly language software by summing its weighted user database density of 0.01 (0.01 multiplied by the initial database frequency weight of 1.0) and its weighted relative density of 10.0 (10.0 multiplied by the initial relative density weight of 1.0). In response to the database system displaying a recommendation for an organization administrator to purchase an assembly language software subset of the data marketplace vendor's dataset, an organization administrator acts to indicate a dislike for this recommendation. The database system learns from this user action, and reduces the weight $w_2$ for the relative density for the assembly language software subset from the initial value of 1.0 to a new value of 0.9. Then the database system determines an evaluation metric of 9.01 for assembly language software by summing its weighted user database density of 0.01 (0.01 multiplied by the initial database frequency weight of 1.0) and its weighted relative density of 9.0 (10.0 multiplied by the new relative density weight of 0.9). Since the relative density for the assembly language software subset was significantly greater than the user database density for the assembly language software subset, a 10% reduction in the relative density weight $w_2$ resulted in a 9.99% reduction in the evaluation metric for the assembly language software subset. In contrast, the database system could have reduced the weight $w_1$ for the user database density for the assembly language software subset from the initial value of 1.0 to a new value of 0.9. For this alternative example, the database system would have determined an evaluation metric of 10.009 for assembly language software by summing its weighted user database density of 0.009 (0.01 multiplied by the new database frequency weight of 0.9) and its weighted relative density of 10.0 (10.0 multiplied by the initial relative density weight of 1.0). In this alternative example, a 10% reduction in the user database density weight $w_1$ for the assembly language software subset would have resulted in only a 0.01% reduction in the evaluation metric for the assembly language software subset.

Although the previous examples described the database system reducing the weights in response to a user disliking a recommendation, the database system may increase the weights in response to positive user actions. For example, the database system moderately increases a weight in response to a user selecting to review a recommendation to purchase a customer relationship management software subset, and then significantly increases the weight in response to the user selecting to purchase the recommended customer relationship management software subset. The database system increased the weight more for a selection to purchase the customer relationship management software subset than for a selection to review the recommendation because the selection to purchase is a stronger positive signal than the selection to review.

The database system may also adjust weights based on downstream feedback, such as feedback arising from opportunities created, won, and lost. If positive or negative events on opportunities can be attributed back to specific recommendations made earlier—not necessarily with certainty—then the database system adjusts the weights similar to the previously described adjustments, just after a (possibly long) delay.

Following the determination of an evaluation metric for a value, a recommendation is output, based on a relationship of the evaluation metric relative to other evaluation metrics for other values, which recommends that the data user acquire at least a part of the dataset, block 110. The system recommends a data provider's dataset based on an evaluation metric. By way of example and without limitation, this can include the database system outputting a high recommendation for the data user to purchase a customer relationship management software subset of the dataset, a medium recommendation for the data user to purchase a database management software subset of the dataset, and a low recommendation for the data user to purchase an assembly language software subset of the dataset. The relative rankings of the recommendations are due to the evaluation metric of 1.6 for customer relationship management software being greater than the evaluation metric of 0.486 for database management software, which is greater than the evaluation metric of 0.1 for assembly language software. Although this example describes recommendations for a data user to purchase subsets of a data marketplace vendor's datasets, the recommendations may be for the data user to acquire (by purchase or any exchange system) any combination of datasets and subsets of datasets from any combination of data providers. For example, the database system outputs a highest recommendation for the data user to purchase a customer relationship management software subset of the data marketplace vendor's dataset, a next highest recommendation for the data user to exchange credits for a crowd-sourced database system user's entire customer relationship management software dataset, and no recommendation to acquire the database management software subset or the assembly language software subset of the data marketplace vendor's dataset.

A recommendation can be a suggestion or proposal as to the best course of action. A part can be a subset, a piece, or a segment of something, such as an object, which combined with other subsets makes up the whole.

The method 100 may be repeated as desired. Although this disclosure describes the blocks 102-110 executing in a particular order, the blocks 102-110 may be executed in a different order. In other implementations, each of the blocks 102-110 may also be executed in combination with other blocks and/or some blocks may be divided into a different set of blocks.

System Overview

Figure 2:
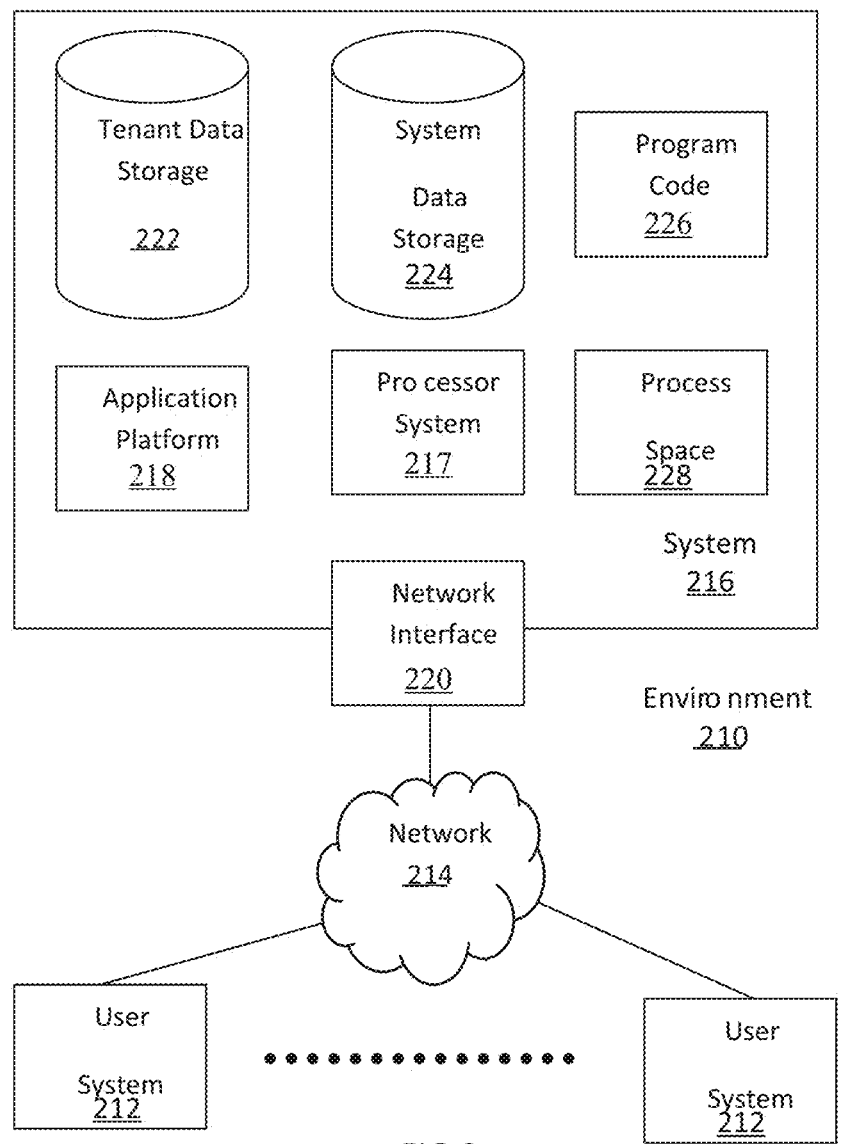
FIG. 2 illustrates a block diagram of an example of an environment wherein an on-demand database service might be used.

FIG. 2 illustrates a block diagram of an environment 210 wherein an on-demand database service might be used. The environment 210 may include user systems 212, a network 214, a system 216, a processor system 217, an application platform 218, a network interface 220, a tenant data storage 222, a system data storage 224, program code 226, and a process space 228. In other embodiments, the environment 210 may not have all of the components listed and/or may have other elements instead of, or in addition to, those listed above.

The environment 210 is an environment in which an on-demand database service exists. A user system 212 may be any machine or system that is used by a user to access a database user system. For example, any of the user systems 212 may be a handheld computing device, a mobile phone, a laptop computer, a work station, and/or a network of computing devices. As illustrated in FIG. 2 (and in more detail in FIG. 4) the user systems 212 might interact via the network 214 with an on-demand database service, which is the system 216.

An on-demand database service, such as the system 216, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 216" and the "system 216" will be used interchangeably herein. A database image may include one or more database objects. A relational database management system (RDMS) or the equivalent may execute storage and retrieval of information against the database object(s). The application platform 218 may be a framework that allows the applications of the system 216 to run, such as the hardware and/or software, e.g., the operating system. In an embodiment, the on-demand database service 216 may include the application platform 218 which enables creation, managing and executing one or more applications developed by the provider of the on-demand database service, users accessing the on-demand database service via user systems 212, or third-party application developers accessing the on-demand database service via the user systems 212.

The users of the user systems 212 may differ in their respective capacities, and the capacity of a particular user system 212 might be entirely determined by permissions (permission levels) for the current user. For example, where a salesperson is using a particular user system 212 to interact with the system 216, that user system 212 has the capacities allotted to that salesperson. However, while an administrator is using that user system 212 to interact with the system 216, that user system 212 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 214 is any network or combination of networks of devices that communicate with one another. For example, the network 214 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 212 might communicate with the system 216 using TCP/IP and, at a higher network level, use other common Internet protocols to communicate, such as HTTP, FTP, AFS, WAP, etc. In an example where HTTP is used, the user systems 212 might include an HTTP client commonly referred to as a "browser" for sending and receiving HTTP messages to and from an HTTP server at the system 216. Such an HTTP server might be implemented as the sole network interface between the system 216 and the network 214, but other techniques might be used as well or instead. In some implementations, the interface between the system 216 and the network 214 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 216, shown in FIG. 2, implements a web-based customer relationship management (CRM) system. For example, in one embodiment, the system 216 includes application servers configured to implement and execute CRM software applications as well as provide related data, code, forms, webpages and other information to and from the user systems 212 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 216 implements applications other than, or in addition to, a CRM application. For example, the system 216 may provide tenant access to multiple hosted (standard and custom) applications, including a CRM application. User (or third-party developer) applications, which may or may not include CRM, may be supported by the application platform 218, which manages creation, storage of the applications into one or more database objects and executing of the applications in a virtual machine in the process space of the system 216.

One arrangement for elements of the system 216 is shown in FIG. 2, including the network interface 220, the application platform 218, the tenant data storage 222 for tenant data 223, the system data storage 224 for system data 225 accessible to the system 216 and possibly multiple tenants, the program code 226 for implementing various functions of the system 216, and the process space 228 for executing MTS system processes and tenant-specific processes, such as running applications as part of an application hosting service. Additional processes that may execute on the system 216 include database indexing processes.

Several elements in the system shown in FIG. 2 include conventional, well-known elements that are explained only briefly here. For example, each of the user systems 212 could include a desktop personal computer, workstation, laptop, PDA, cell phone, or any wireless access protocol (WAP) enabled device or any other computing device capable of interfacing directly or indirectly to the Internet or other network connection. Each of the user systems 212 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 212 to access, process and view information, pages and applications available to it from the system 216 over the network 214. Each of the user systems 212 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 216 or other systems or servers. For example, the user interface device may be used to access data and applications hosted by the system 216, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 212 and all of its components are operator configurable using applications, such as a browser, including computer code run using a central processing unit such as an Intel Pentium® processor or the like. Similarly, the system 216 (and additional instances of an MTS, where more than one is present) and all of their components might be operator configurable using application(s) including computer code to run using a central processing unit such as the processor system 217, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 216 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 216 is configured to provide webpages, forms, applications, data and media content to the user (client) systems 212 to support the access by the user systems 212 as tenants of the system 216. As such, the system 216 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 3:
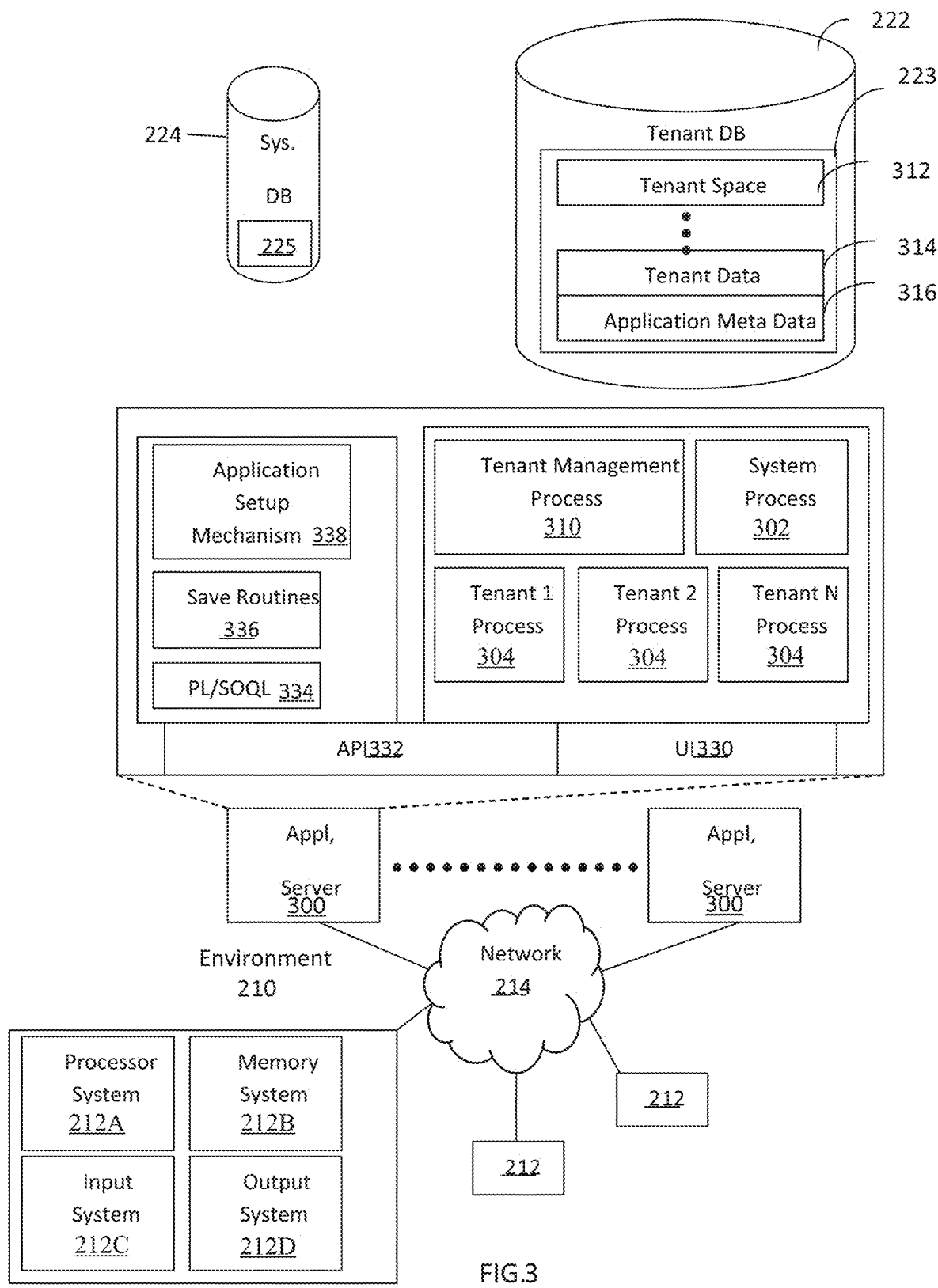
FIG. 3 illustrates a block diagram of an embodiment of elements of FIG. 2 and various possible interconnections between these elements.

FIG. 3 also illustrates the environment 210. However, in FIG. 3 elements of the system 216 and various interconnections in an embodiment are further illustrated. FIG. 3 shows that the each of the user systems 212 may include a processor system 212A, a memory system 212B, an input system 212C, and an output system 212D. FIG. 3 shows the network 214 and the system 216. FIG. 3 also shows that the system 216 may include the tenant data storage 222, the tenant data 223, the system data storage 224, the system data 225, a User Interface (UI) 330, an Application Program Interface (API) 332, a PL/SOQL 334, save routines 336, an application setup mechanism 338, applications servers 300$_1$-300$_N$, a system process space 302, tenant process spaces 304, a tenant management process space 310, a tenant storage area 312, a user storage 314, and application metadata 316. In other embodiments, the environment 210 may not have the same elements as those listed above and/or may have other elements instead of, or in addition to, those listed above.

The user systems 212, the network 214, the system 216, the tenant data storage 222, and the system data storage 224 were discussed above in FIG. 2. Regarding the user systems 212, the processor system 212A may be any combination of one or more processors. The memory system 212B may be any combination of one or more memory devices, short term, and/or long-term memory. The input system 212C may be any combination of input devices, such as one or more keyboards, mice, trackballs, scanners, cameras, and/or interfaces to networks. The output system 212D may be any combination of output devices, such as one or more monitors, printers, and/or interfaces to networks. As shown by FIG. 3, the system 216 may include the network interface 220 (of FIG. 2) implemented as a set of HTTP application servers 300, the application platform 218, the tenant data storage 222, and the system data storage 224. Also shown is the system process space 302, including individual tenant process spaces 304 and the tenant management process space 310. Each application server 300 may be configured to access tenant data storage 222 and the tenant data 223 therein, and the system data storage 224 and the system data 225 therein to serve requests of the user systems 212. The tenant data 223 might be divided into individual tenant storage areas 312, which can be either a physical arrangement and/or a logical arrangement of data. Within each tenant storage area 312, the user storage 314 and the application metadata 316 might be similarly allocated for each user. For example, a copy of a user's most recently used (MRU) items might be stored to the user storage 314. Similarly, a copy of MRU items for an entire organization that is a tenant might be stored to the tenant storage area 312. The UI 330 provides a user interface and the API 332 provides an application programmer interface to the system 216 resident processes to users and/or developers at the user systems 212. The tenant data and the system data may be stored in various databases, such as one or more Oracle™ databases.

The application platform 218 includes the application setup mechanism 338 that supports application developers' creation and management of applications, which may be saved as metadata into the tenant data storage 222 by the save routines 336 for execution by subscribers as one or more tenant process spaces 304 managed by the tenant management process 310 for example. Invocations to such applications may be coded using the PL/SOQL 334 that provides a programming language style interface extension to the API 332. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 316 for the subscriber making the invocation and executing the metadata as an application in a virtual machine.

Each application server 300 may be communicably coupled to database systems, e.g., having access to the system data 225 and the tenant data 223, via a different network connection. For example, one application server $300_1$ might be coupled via the network 214 (e.g., the Internet), another application server $300_{N-1}$ might be coupled via a direct network link, and another application server $300_N$ might be coupled by yet a different network connection. Transfer Control Protocol and Internet Protocol (TCP/IP) are typical protocols for communicating between application servers 300 and the database system. However, it will be apparent to one skilled in the art that other transport protocols may be used to optimize the system depending on the network interconnect used.

In certain embodiments, each application server 300 is configured to handle requests for any user associated with any organization that is a tenant. Because it is desirable to be able to add and remove application servers from the server pool at any time for any reason, there is preferably no server affinity for a user and/or organization to a specific application server 300. In one embodiment, therefore, an interface system implementing a load balancing function (e.g., an F5 Big-IP load balancer) is communicably coupled between the application servers 300 and the user systems 212 to distribute requests to the application servers 300. In one embodiment, the load balancer uses a least connections algorithm to route user requests to the application servers 300. Other examples of load balancing algorithms, such as round robin and observed response time, also can be used. For example, in certain embodiments, three consecutive requests from the same user could hit three different application servers 300, and three requests from different users could hit the same application server 300. In this manner, the system 216 is multi-tenant, wherein the system 216 handles storage of, and access to, different objects, data and applications across disparate users and organizations.

As an example of storage, one tenant might be a company that employs a sales force where each salesperson uses the system 216 to manage their sales process. Thus, a user might maintain contact data, leads data, customer follow-up data, performance data, goals and progress data, etc., all applicable to that user's personal sales process (e.g., in the tenant data storage 222). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 216 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 216 might also maintain system level data usable by multiple tenants or other data. Such system level data might include industry reports, news, postings, and the like that are sharable among tenants.

In certain embodiments, the user systems 212 (which may be client systems) communicate with the application servers 300 to request and update system-level and tenant-level data from the system 216 that may require sending one or more queries to the tenant data storage 222 and/or the system data storage 224. The system 216 (e.g., an application server 300 in the system 216) automatically generates one or more SQL statements (e.g., one or more SQL queries) that are designed to access the desired information. The system data storage 224 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system comprising:
one or more processors; and
a non-transitory computer readable medium storing a plurality of instructions, which when executed, cause the one or more processors to:
determine, by a database system, a provider dataset density for a value by identifying a relationship of a total number of records in a dataset that store the value in record fields of an attribute compared to a total number of records in the dataset that store any value in record fields of the attribute, wherein the dataset is provided by a data provider;
determine, by the database system, a user database density for the value by identifying a relationship of a total number of records in a database that store the value in record fields of the attribute compared to a total number of records in the database that store any value in record fields of the attribute, wherein the database is used by a data user;
determine, by the database system, a relative density based on a relationship between the provider dataset density and the user database density;
determine, by the database system, an evaluation metric for the value, based on a combination of the relative density and the user database density; and
cause, by the database system, a recommendation to be outputted, based on a relationship of the evaluation metric relative to other evaluation metrics for other values, which recommends that the data user acquire at least a part of the dataset.

2. The system of claim 1, wherein the total number of records in the database that store the value in record fields of the attribute is based on a plurality of weights that are associated with a plurality of instances of the value and that correspond to a plurality of entities stored by the database.

3. The system of claim 1, wherein determining the relative density based on the relationship between the provider dataset density and the user database density comprises determining a ratio between the user database density and the provider dataset density.

4. The system of claim 1, wherein the combination of the relative density and the user database density comprises one of a sum of the relative density and the user database density, and a product of the relative density and the user database density.

5. The system of claim 4, wherein the sum of the relative density and the user database density comprises a sum of a first product and a second product, the first product being a product of the relative density and a relative density weight, the second product being a product of the user database density and a user database density weight, at least one of the relative density weight and the user database density weight being adjusted based on usage of the database by at least one data user.

6. The system of claim 1, wherein at least the part of the dataset comprises a subset of a larger dataset provided by the data provider.

7. A computer program product comprising a non-transitory computer-readable medium which stores computer-readable program code to be executed by one or more processors when retrieved from a non-transitory computer-readable medium, the non-transitory computer-readable medium comprising program code including instructions to:
determine, by a database system, a provider dataset density for a value by identifying a relationship of a total number of records in a dataset that store the value in record fields of an attribute compared to a total number of records in the dataset that store any value in record fields of the attribute, wherein the dataset is provided by a data provider;
determine, by the database system, a user database density for the value by identifying a relationship of a total number of records in a database that store the value in record fields of the attribute compared to a total number of records in the database that store any value in record fields of the attribute, wherein the database is used by a data user;

determine, by the database system, a relative density based on a relationship between the provider dataset density and the user database density;

determine, by the database system, an evaluation metric for the value, based on a combination of the relative density and the user database density; and cause, by the database system, a recommendation to be outputted, based on a relationship of the evaluation metric relative to other evaluation metrics for other values, which recommends that the data user acquire at least a part of the dataset.

8. The computer program product of claim 7, wherein the total number of records in the database that store the value in record fields of the attribute is based on a plurality of weights that are associated with a plurality of instances of the value and that correspond to a plurality of entities stored by the database.

9. The computer program product of claim 7, wherein determining the relative density based on the relationship between the provider dataset density and the user database density comprises determining a ratio between the user database density and the provider dataset density.

10. The computer program product of claim 7, wherein the combination of the relative density and the user database density comprises one of a sum of the relative density and the user database density, and a product of the relative density and the user database density, and wherein the sum of the relative density and the user database density comprises a sum of a first product and a second product, the first product being a product of the relative density and a relative density weight, the second product being a product of the user database density and a user database density weight, at least one of the relative density weight and the user database density weight being adjusted based on usage of the database by at least one data user.

11. The computer program product of claim 7, wherein at least the part of the dataset comprises a subset of a larger dataset provided by the data provider.

12. A method comprising:

determining, by a database system, a provider dataset density for a value by identifying a relationship of a total number of records in a dataset that store the value in record fields of an attribute compared to a total number of records in the dataset that store any value in record fields of the attribute, wherein the dataset is provided by a data provider;

determining, by the database system, a user database density for the value by identifying a relationship of a total number of records in a database that store the value in record fields of the attribute compared to a total number of records in the database that store any value in record fields of the attribute, wherein the database is used by a data user;

determining, by the database system, a relative density based on a relationship between the provider dataset density and the user database density;

determining, by the database system, an evaluation metric for the value, based on a combination of the relative density and the user database density; and causing, by the database system, a recommendation to be outputted, based on a relationship of the evaluation metric relative to other evaluation metrics for other values, the recommendation being that the data user acquire at least a part of the dataset.

13. The method of claim 12, wherein the total number of records in the database that store the value in record fields of the attribute is based on a plurality of weights that are associated with a plurality of instances of the value and that correspond to a plurality of entities stored by the database.

14. The method of claim 12, wherein determining the relative density based on the relationship between the provider dataset density and the user database density comprises determining a ratio between the user database density and the provider dataset density.

15. The method of claim 12, wherein the combination of the relative density and the user database density comprises one of a sum of the relative density and the user database density, and a product of the relative density and the user database density.

16. The method of claim 15, wherein the sum of the relative density and the user database density comprises a sum of a first product and a second product, the first product being a product of the relative density and a relative density weight, the second product being a product of the user database density and a user database density weight, at least one of the relative density weight and the user database density weight being adjusted based on usage of the database by at least one data user.

17. The method of claim 12, wherein at least the part of the dataset comprises a subset of a larger dataset provided by the data provider.

* * * * *